US006534154B1

(12) United States Patent
Hayashi et al.

(10) Patent No.: US 6,534,154 B1
(45) Date of Patent: Mar. 18, 2003

(54) IMAGE RECEIVING SHEET

(75) Inventors: Masafumi Hayashi, Tokyo-to (JP); Nobuho Ikeuchi, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 09/464,604

(22) Filed: Dec. 15, 1999

(30) Foreign Application Priority Data

Dec. 16, 1998 (JP) ........................................ 10-357170

(51) Int. Cl.[7] ........................ B32B 27/14; B32B 3/00
(52) U.S. Cl. ..................... 428/195; 428/212; 428/323
(58) Field of Search ............................ 428/195, 212, 428/354, 323, 447, 480, 913

(56) References Cited

U.S. PATENT DOCUMENTS

| | | | | | |
|---|---|---|---|---|---|
| 6,063,538 | A | * | 5/2000 | Hayashi et al. | 430/124 |
| 6,120,893 | A | * | 9/2000 | Kurokawa et al. | 428/354 |
| 6,312,788 | B1 | * | 11/2001 | Mohri et al. | 428/195 |

FOREIGN PATENT DOCUMENTS

| | | | |
|---|---|---|---|
| JP | 05006020 | 1/1993 | G03G/7/00 |
| JP | 06019179 | 1/1994 | G03G/7/00 |
| JP | 11288122 | 10/1999 | G03G/7/00 |

* cited by examiner

*Primary Examiner*—Cynthia H. Kelly
*Assistant Examiner*—B. Shewareged
(74) *Attorney, Agent, or Firm*—Ladas & Parry

(57) ABSTRACT

Disclosed is an image-receiving sheet having better toner-fixing ability, an excellent image quality and high carriage quality in electrophotographic copying machines and printers. In an image-receiving sheet in which a layer containing a binder and a filler is formed on one surface of a substrate 1, the Beck smoothness of the containment layer is 2000 seconds or less and the haze of the image-receiving sheet is 5 to 15% to stabilize the carriage quality and to obtain a high quality image from OHP projectors. The containment layer is either one of a receptor layer 2 for recording an image or a backface layer 3 and in the image-receiving sheet, a layer having a Beck smoothness of 20000 seconds or less is formed on the surface opposite to the surface of the substrate 1 on which the containment layer is formed, thereby further bettering the carriage quality. Moreover, resistance control layers 41, 42 are formed on an image-receiving surface and/or the outermost layer of the backface, or between the receptor layer 2 and the substrate 1 or between the backface 3 and the substrate 1, thereby maintaining better antistatic ability and toner-fixing ability.

7 Claims, 2 Drawing Sheets

IMAGE RECEIVING SHEET

BACKGROUND OF THE INVENTION

The present invention relates to an image-receiving sheet used to transfer and record a visual image formed by developing an electrostatic latent image by using a toner, and, especially, to a highly transparent OHP image-receiving sheet used for copying machines and printers using an electrophotographic system in which the mechanical carriage quality is greatly influenced by the surface smoothness of an image-receiving sheet.

In recent years, methods of forming a full color image by using an electrophotographic system has been put to practical use wherein toners respectively having three colors consisting of a yellow color, magenta color and cyan color or four colors including a black color in addition to these three colors are used.

An image-receiving sheet used in this electrophotographic system has a general structure, in which a receptor layer for recording an image is formed on a substrate, to record and store recording information including characters and images without fail. This image-receiving sheet is used for OHPs (overhead projectors) as information-conveying means utilized in, for example, lectures, schools, business offices and other explanatory meetings and exhibitions.

While, in current full color copying machines and printers using an electrophotographic system, a toner offset and further a receptor layer offset in the case of OHP sheets provided with a receptor layer for recording an image tend to be produced on account of heat and pressure when a toner is melted and fixed in a step of fixing the toner. Therefore, in such a system, silicon oil is usually applied to a fixing roller in the fixing step.

In current full color copying machines and printers using an electrophotographic system as mentioned above, an image-receiving sheet is supplied from a cassette or by hand. In this case, the front end portion of the image-receiving sheet is caught up in a roller for carriage, giving rise to the problem of the degree of catching force. Also, there is the drawback that the image-receiving sheet approaches a fixing roller with difficulty.

In, especially, image-receiving sheets for OHP, the surface thereof is not so much roughened by designing the haze (misting value) to be 10% or less and preferably 5% or less to maintain the transparency with the smoothness being about 1000 to 5000 seconds.

Such an image-receiving sheet tends to pose the problem of carriage inferior in printers.

As stated above, there are no image-receiving sheets which are conventionally used in an electrophotographic system and excel in toner-fixing ability and in the qualities needed in carriages inclusive of paper-feed in a well-balanced manner in electrophotographic copying machines and printers. Particularly, there is no image-receiving sheet suitable to a full color system in which toners are overlaid and fixed.

SUMMARY OF THE INVENTION

In light of this situation, it is an object of the present invention to provide an image-receiving sheet which has better toner-fixing ability and gives high image quality and high carriage qualities needed in electrophotographic copying machines and in printers.

The above object can be attained by the provision of an image-receiving sheet according to the present invention, the image-receiving sheet comprising a layer containing a binder and a filler on at least one surface of a substrate, wherein the containment layer has a Beck smoothness of 2000 seconds or less and the haze of the image-receiving sheet is 5 to 15%. The invention serves to stabilize carriage qualities in printers and the like.

Preferably the image-receiving sheet is provided with a layer having a Beck smoothness of 20000 seconds or less on the surface opposite to the surface of the substrate on which the containment layer is formed. The invention reduces the contact points between image-receiving sheets and stabilizes the carriage qualities.

Preferably the containment layer is either one of a receptor layer for recording an image and a backface layer.

It is preferable to control the resistance of the image-receiving sheet of the present invention according to the following methods.

A resistance control layer is formed on the outermost layer of the image-receiving surface and/or backface of the image-receiving sheet.

Preferably a resistance control layer is formed between the containment layer and the substrate and/or between the layer having a Beck smoothness of 20000 seconds or less and the substrate.

Given as examples of resistance control materials used for the resistance control layer are ion-conductive materials, fine metal particles and conductive polymers having conjugated double bond of $\pi$ electrons.

Preferably the image-receiving sheet has a parallel ray transmittance of 70% or more.

The action of the present invention is as follows.

In an image-receiving sheet provided with a layer containing a binder and a filler on at least one surface of a substrate, the containment layer has a Beck smoothness of 2000 seconds or less and the haze of the image-receiving sheet is designed to be 5 to 15%. This structure stabilizes the carriage qualities in printers or the like and gives a high quality to an image of an OHP projector.

The above containment layer is either one of a receptor layer for recording an image and a backface layer. Also, in the image-receiving sheet, a layer having a Beck smoothness of 20000 seconds or less is provided on the surface opposite to the surface of the substrate on which the containment layer is formed, further improving the carriage qualities.

Further, a resistance control layer is formed on the outermost layer of the image-receiving surface and/or backface or between the containment layer and the substrate and/or between the backface layer and the substrate. This is the reason why good antistatic ability and toner-fixing ability can be maintained. The use of ion-conductive materials, fine metal particles and conductive polymers having conjugated double bond of $\pi$ electrons as the resistance control materials for the resistance control layer has the advantage that the coating surface is not sticky and there is no phenomenon that the resistance material is transferred to the contact surface during storing to thereby change the surface resistivity.

DETAILED DESCRIPTION OF THE PREFERRED EMBODIMENTS

The present invention will now be explained by way of embodiments of an electrophotographic image-receiving sheet in more detail. It is to be noted that the image-receiving sheet involves the whole of image-receiving sheets used to transfer and record a visual image formed by developing an electrostatic latent image by using a toner but is not limited only to electrophotographic recording image-receiving sheets.

The embodiments of the present invention will be explained based on the drawings.

Figure 1:
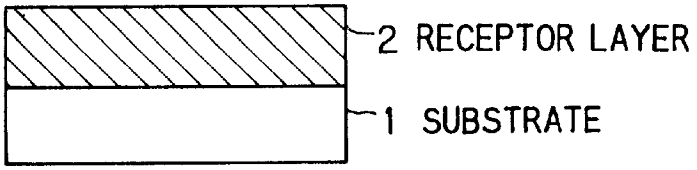
FIG. 1 is a vertical sectional view showing an embodiment of an image-receiving sheet according to the present invention.

FIG. 1 is a vertical sectional view showing one embodiment of an image-receiving sheet according to the present invention. The image-receiving sheet comprises a receptor layer 2, for recording an image, on one surface of a substrate 1. The receptor layer contains a binder and a filler and has a Beck smoothness of 2000 seconds or less.

Figure 2:
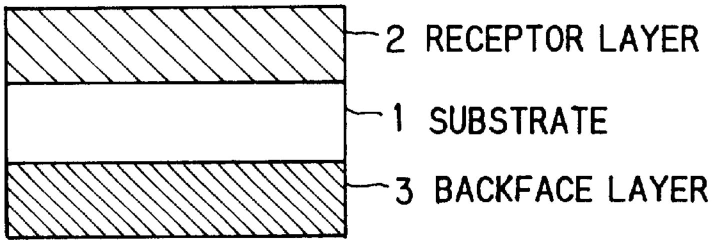
FIG. 2 is a vertical sectional view showing another embodiment of an image-receiving sheet according to the present invention.

FIG. 2 to FIG. 7 are vertical sectional views showing other embodiments of the image-receiving sheets of the present invention. FIG. 2 shows an image-receiving sheet provided with a receptor layer 2, for recording an image, on one surface of a substrate 1 and a backface layer 3 on the other surface of the substrate, the backface layer 3 having a Beck smoothness of 20000 seconds or less.

Figure 3:
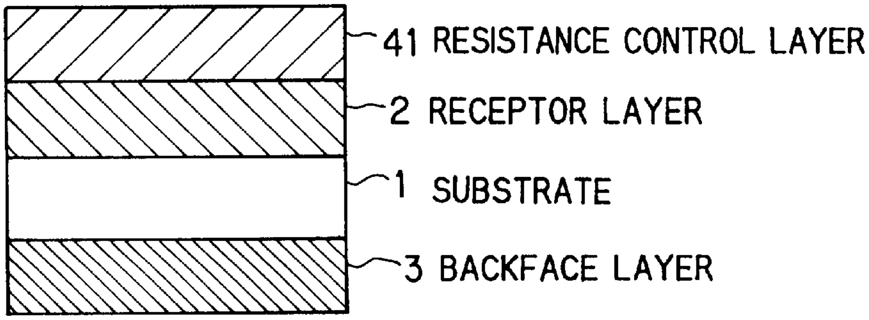
FIG. 3 is a vertical sectional view showing still another embodiment of an image-receiving sheet according to the present invention.

FIG. 3 shows an image-receiving sheet having the structure in which a receptor layer 2 for recording an image is formed on one surface of a substrate 1, a resistance control layer 41 is formed on the receptor layer 2 and a backface layer 3 is formed on the other surface of a substrate 1.

Figure 4:
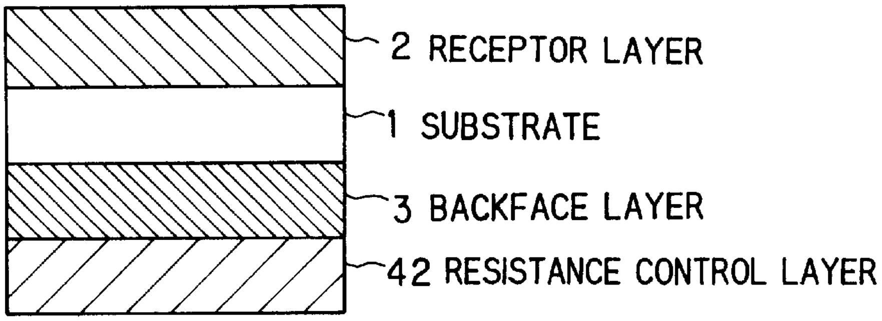
FIG. 4 is a vertical sectional view showing a further embodiment of an image-receiving sheet according to the present invention.

FIG. 4 shows an image-receiving sheet having the structure in which a receptor layer 2 for recording an image is formed on one surface of a substrate 1 and a backface layer 3 and a resistance control layer 42 are formed on the other surface of a substrate 1 in this order.

Figure 5:
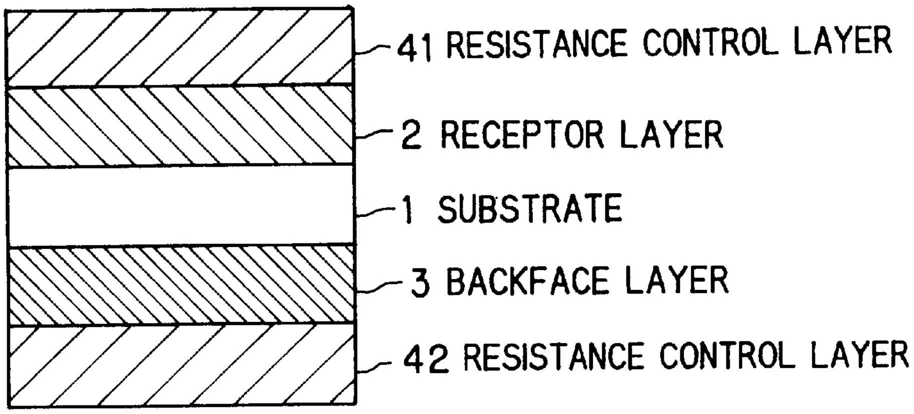
FIG. 5 is a vertical sectional view showing a still further embodiment of an image-receiving sheet according to the present invention.

FIG. 5 shows an image-receiving sheet having the structure in which a receptor layer 2 for recording an image is formed on one surface of a substrate 1, a resistance control layer 41 is formed on the receptor layer 2 for recording an image and a backface layer 3 and a resistance control layer 42 are formed on the other surface of a substrate 1 in this order.

Figure 6:
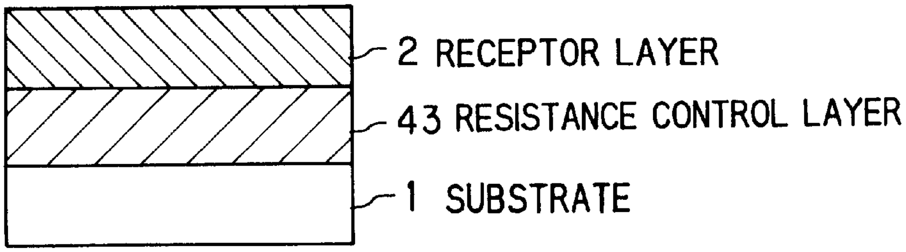
FIG. 6 is a vertical sectional view showing an additional embodiment of an image-receiving sheet according to the present invention.

FIG. 6 shows an image-receiving sheet having the structure in which a receptor layer 2 for recording an image is formed on one surface of a substrate 1 trough a resistance control layer 43.

Figure 7:
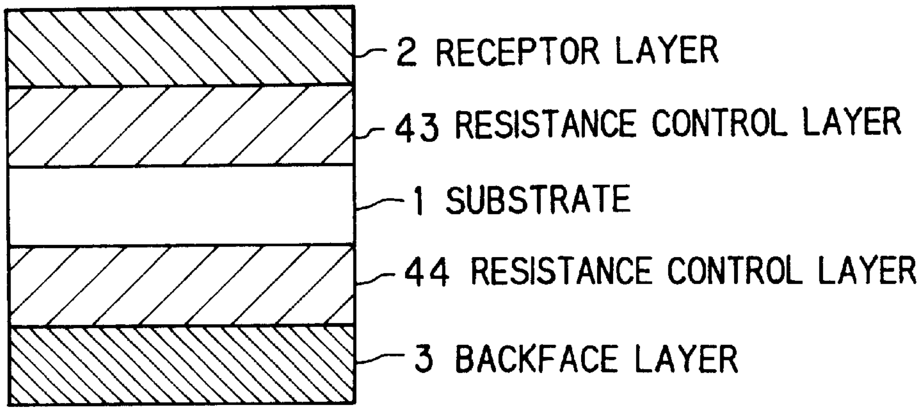
FIG. 7 is a vertical sectional view showing a still additional embodiment of an image-receiving sheet according to the present invention.

FIG. 7 shows an image-receiving sheet having the structure in which a receptor layer 2 for recording an image is formed on one surface of a substrate 1 trough a resistance control layer 43 and a backface layer 3 is formed on the other surface of the substrate 1 through a resistance control layer 44.

As mentioned above, the image-receiving sheet of the present invention may be provided with a resistance control layer formed on the outermost layer of the image-receiving surface and/or backface or between the receptor layer for recording an image and the substrate and/or between the backface layer and the substrate. The image-receiving sheet of the present invention has the ability to control the surface electrical resistivity of the surface or backface of the image-receiving sheet. Although the resistance control layer may be formed on either of the image-receiving surface or the backface, it may be formed on both surfaces.

In the case where the surface electrical resistivity of the backface side of the substrate is not so high, the resistance control layer of the backface side may not be formed.

The structure of each part of the image-receiving sheet according to the present invention will be hereinafter explained one by one.

(Substrate)

As the substrate 1 used in the image-receiving sheet of the present invention, those formed of a thermoplastic resin provided with transparency, heat resistance, dimensional stability and rigidity are preferred when the image-receiving sheet is used in the applications where a recorded image is observed using transmitted light, as for example in OHP sheets. Preferable examples of the material used for the substrate 1 include films or sheets of a resin having a thickness of 10 to 250 μm and preferably 50 to 180 μm, the resin including a polyethylene terephthalate resin, polycarbonate resin, acrylic resin, polyvinyl chloride resin, polypropylene resin, polystyrene resin, polyethylene resin, cellulose diacetate resin and cellulose triacetate resin. Among these resins, a polyethylene terephthalate resin, polyvinyl chloride resin, polypropylene resin and cellulose triacetate resin are preferable in view of the aforementioned performances.

When the image-receiving sheet of the present invention is used in the applications where a recorded image is observed using transmitted light, as for example in OHP sheets, the image-receiving sheet is preferably designed to have a parallel ray transmittance of 70% or more provided that the image-receiving sheet has the entire structure comprising a substrate and a receptor layer for recording an image, to which, as required, a resistance control layer, a backface layer and the like are added. An excellent transmitted image can be thereby obtained.

The surface of the substrate 1 may be provided with well-known easy bonding treatment such as primer treatment or corona discharge treatment for the purpose of improving the adhesion to layers to be formed on the substrate 1.

(Receptor Layer)

The receptor layer 2 formed on at least one surface of the substrate to record an image is preferably made of a resin having toner-fixing ability and high wettability to color toners, especially, in OHP applications in full color electrophotographic system.

The receptor layer is a layer containing a binder and a filler and the Beck smoothness thereof is of the order of 2000 seconds or less. When the backface layer is a layer containing a binder and a filler and the Beck smoothness thereof is 2000 seconds or less, it is desirable that the Beck smoothness of the receptor layer is 20000 seconds or less. Namely, the relation between the receptor layer and the backface layer may be reversed.

The Beck smoothness is measured according to the method in which the surface of a test specimen and the surface of a pushing glass with a hole formed in the center thereof are overlapped on each other and 10 ml of air is injected from the hole, and is defined as the time (seconds) required to decrease the degree of vacuum from 380 mmHg to 360 mmHg, namely as the time required for 10 ml of air to pass through the space between the glass surface and the surface of the test specimen.

When the Beck smoothness exceeds 2000 seconds, the pickup quality of the image-receiving sheet during paper feeding from a cassette is reduced, leading to carriage inferiors. The lower limit of the Beck smoothness, on the other hand, is about 500 seconds. When the smoothness is excessively low, the surface of the receptor layer is too roughened, leading to reduced transparency.

Examples of the binder resin forming the receptor layer include polyolefin resins such as polyethylene and polypropylene, vinyl resins such as polyvinyl chloride, polyvinylidene chloride, polyvinyl acetate, vinyl chloride/vinyl acetate copolymers, polyacrylates and polystyrene, polyester resins produced by condensation-polymerizing a diol having a bisphenol skeleton or an alkylene skeleton and a divalent or trivalent carboxylic acid and their modified compounds, epoxy resins, polyamide type resins, copolymers of polyolefins, of, for example, ethylene and propylene and other vinyl monomers, ionomers, cellulose type resins such as ethyl cellulose and cellulose acetate, polycarbonate resins and phenoxy resins.

As the binder resin, those comprised in the above examples and having a softening point of 30° C. to 200° C. are used. Resins whose softening point is less than 30° C. are not preferable on account of poor storage stability and a phenomenon that the receptor layer adheres to the contact surface when the image-receiving sheets are piled, namely a blocking phenomenon tends to occur. On the other hand, a softening point exceeding 200° C. is undesirable because a large amount of energy is needed in the formation of an image.

As the thermoplastic resin used for the receptor layer, low molecular weight polyester resins or their modified compounds or epoxy resins are preferably used in consideration of the adhesion to the substrate and compatibility with a toner.

Taking the above necessary abilities into consideration, the specific polyester resins disclosed in Japanese Patent Application No. 6-36609 by the applicants of the present invention are preferably used.

Specifically, a polyester resin using, as a diol component, a denatured bisphenol A which is modified using ethylene glycol or propylene glycol and represented by the chemical formula 1 described below has high toner-fixing ability. The chemical formula 2 shown below represents a propylene glycol modified bisphenol A which is a specific compound of the modified bispshenol A.

[Chemical Formula 1]

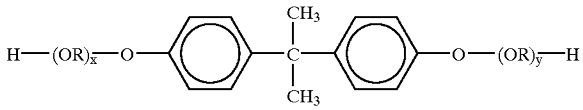

wherein R represents an ethylene group or a propylene group and x and y denote integers from 1 to 5 with the average value of x and y being 1 to 3.

[Chemical Formula 2]

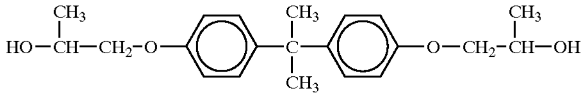

Polyester resins using, as a diol component, a denatured bisphenol A which is modified using ethylene glycol or propylene glycol have high toner-fixing ability. Examples of the acidic component of the polyester resin, although no particular limitation is imposed on the acidic component, include fumaric acid, phthalic acid, terephthalic acid, isophthalic acid, maleic acid, succinic acid, adipic acid, citraconic acid, itaconic acid, sebacic acid, malonic acid, hexacarboxylic acid and trimellitic acid.

Among these polyester resins, resins using, as a diol component, propylene glycol or ethylene glycol modified bisphenol A represented by the chemical formula 1 and as an acidic component, fumaric acid, maleic acid, terephthalic acid or trimellitic acid have excellent compatibility particularly with a binder resin of a toner, high toner-fixing ability and good wettability to a toner, thereby giving high quality image.

Such polyester or epoxy resins as aforementioned are made water-dispersible by a general method in which these resins are dissolved in a ketone type solvent, to which a dispersant and water are added, followed by removing the solvent.

Moreover, as the modified compounds, urethane modified polyesters produced by a solution polymerization method may be exemplified.

The epoxy resins are produced from polymers having two or more epoxy groups in a molecule and by a ring-opening reaction of the epoxy groups. These resins are obtained by reacting, primarily, epichlorohydrin and a compound having an active hydrogen with the polymer, followed-by a de-hydrochloric acid reaction.

Among these epoxy resins, bisphenol A type epoxy resins with an epoxy equivalence of 500 g to 5000 g are preferred. These epoxy resins are produced by a condensation reaction between epichlorohydrin and a bisphenol A and have the structural formula represented by the following chemical formula 3.

[Chemical Formula 3]

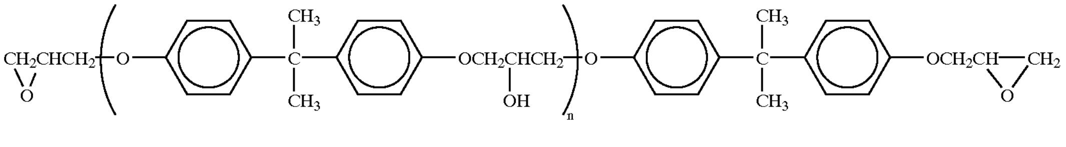

As the binder resin of the receptor layer, phenoxy resins may also be used. The phenoxy resin is synthesized primarily from epichlorohydrin and a bisphenol and possesses no reactive epoxy group at its terminal. To state in more detail, it is synthesized by reacting a high purity bisphenol A with epichlorohydrin in a ratio by mol of 1:1 or a high purity bisphenol A diglycidyl ether with a bisphenol A in a ratio by mol of 1:1.

Furthermore, when the offset of the receptor layer during fixing is considered, materials having a large molecular weight such as urethane modified polyester resins are desirably used.

The receptor layer 2 may include other resins in addition to the aforementioned polyester resin. Examples of these other resins include polyolefin resins such as polyethylene and polypropylene, vinyl chloride resins, vinylidene chloride resins, vinyl acetate resins, vinyl chloride/vinyl acetate copolymers, acrylic resins such as polyacrylates, polystyrene resins, polyamide resins, copolymers of olefins such as ethylene or propylene and other polymerizable monomers, cellulose type resins such as ethyl cellulose and cellulose acetate, ionomers, polycarbonate resins and polyester resins other than the aforementioned polyester resins such as polyethylene terephthalate and polybutylene terephthalate.

The receptor layer 2 contains one or both of an organic filler and an inorganic filler to improve the carriage qualities. Given as examples of the organic filler are fine particles consisting of organic resins including fluororesins such as ethylene tetrafluoride resins and ethylene/ethylene tetrafluoride copolymers, polyethylene resins, polystyrene resins, acrylic resins, polyamide resins and benzoguanamine resins. On the other hand, given as examples of the inorganic filler are silica, colloidal silica, alumina, kaolin, clay, calcium carbonate, talc and titanium dioxide.

The average particle diameter of the filler to be contained is about 0.1 to 30 μm and preferably 3 to 20 μm. When the average particle diameter is less than 0.1 μm, a desired effect is obtained only insufficiently, and when the average particle diameter exceeds 30 μm, an image defect is caused and the transparency is reduced when the image-receiving sheet is used for OHP. The average particle diameter out of the above-defined range is therefore undesirable. The content of the filler is preferably in a range between 0.1 and 10% by weight on the basis of the binder resin of the receptor layer. An excessive content causes the transparency to decrease with the result that the haze of the entire structure of the image-receiving sheet exceeds 15% whereas excessively small content results in no production of a desired effect of improving carriage qualities.

The content of the filler in the receptor layer binder resin and the thickness of the receptor layer are controlled in this manner to thereby set the Beck smoothness of the receptor layer to 2000 seconds or less and to make the haze of the entire image-receiving sheet fall in a range between 5 to 15%.

Incidentally, the haze (misting value) is measured according to the method prescribed in JIS K 7105 and obtained by calculating the ratio, diffuse transmittance/all beam transmittance.

In the receptor layer, other than the above filler, additives such as various surfactants, waxes and oils may be used by mixing them to the extent that the effect of the present invention is not impaired. The receptor layer is formed by applying a coating solution containing the above resin components, fillers and as required, various additives by means of a well-known printing method, e.g., gravure printing or silk screen printing or by means of a well-known application method, e.g., gravure coating, in a thickness of about 1 to 10 μm after being dried.

(Backface Layer)

The image-receiving sheet of the present invention may be provided with a backface layer 3 containing a filler or a Si group on the other surface of the substrate as required. The image-receiving sheet of the present invention may be formed with a backface layer on the side of the substrate, on which the receptor layer is not formed, to more improve the carriage qualities and to impart curling resistance to the receptor layer formed to record an image on the surface side of the substrate. Moreover, the backface layer may be formed on one surface of the image-receiving layer whether the surface is the front or back side or on both surfaces of the image-receiving layer when it is allowed to have the same image-receiving ability as the receptor layer formed on the surface of the substrate.

In the case of providing the backface layer in the present invention, the Beck smoothness of the backface layer is designed to be 20000 seconds or less, thereby obtaining better the carriage qualities in electrophotographic copying machines and printers. When the Beck smoothness exceeds 20000 seconds, the image-receiving sheet approaches a fixing roller with difficulty, leading to carriage inferior. On the other hand, the lower limit of the Beck smoothness of the backface layer is of the order of 500 seconds. An excessively low smoothness causes the transparency to decrease. In the image-receiving sheet of the present invention, the receptor layer is formed such that the Beck smoothness is 2000 seconds or less to form certain irregularities on the surface. It is therefore desirable that the Beck smoothness of the backface layer be designed to be relatively high to suppress a reduction in the transparency of the image-receiving sheet.

It is to be noted that when the Beck smoothness of the receptor layer is 20000 seconds or less, the Beck smoothness of the backface layer is preferably designed to be 2000 seconds or less. Namely, the relation between the receptor layer and the backface layer may be reversed.

Examples of materials which may be used for the backface layer include acrylic resins, polyester resins, urethane type resins, and thermoplastic resins to which a silicone group is added, such as silicone modified acrylic resins, silicone modified urethane type resins and silicone modified polyester type resins. Graft copolymers in which at least one releasable segment selected from the group consisting of a polysiloxane segment, carbon fluoride segment and long chain alkyl segment is contained in the principal chain of an acryl, vinyl, polyester, polyurethane, polyamide and cellulose type binder resins, may be used as the thermoplastic resin.

The formation of the backface layer is carried out by blending the above resin, organic or inorganic filler and, if required, other additives by using a well-known applying means like in the receptor layer. If the thickness of the backface layer is about 0.01 to 1.0 μm in a dried condition, a sufficient effect is obtained. In the case of controlling the surface resistivity, it is necessary to provide the thickness meeting the demand of the case and the thickness is preferably about 0.1 to 2.0 μm.

As to the filler for the backface layer, given as examples of the organic filler are fillers composed of organic resins including fluororesins such as ethylene tetrafluoride resins and ethylene/ethylene tetrafluoride copolymers, polyethylene resins, polystyrene resins, acrylic resins, polyamide resins and benzoguanamine resins. On the other hand, given as examples of materials which may be used for the inorganic filler are silica, colloidal silica, alumina, kaolin, clay, calcium carbonate, talc and titanium dioxide.

(Resistance Control Layer)

The resistance control layer is formed on the outermost layer of the image-receiving surface and/or backface or between the receptor layer and the substrate and/or between the backface layer and the substrate, whereby the antistatic ability and toner-fixing ability can be satisfactorily maintained.

Given as examples of resistance control materials used for the resistance control layer are ion-conductive materials, fine metal particles and conductive polymers having conjugated double bond of $\pi$ electrons.

There a re positive, negative and amphoteric ion types as the ion-conductive materials. Examples of the ion-conductive materials include cationic antistatic agents such as quaternary ammonium salts and polyamine derivatives, anionic antistatic agents such as alkyl phosphates and non-ionic antistatic agents such as fatty acid esters.

Given as examples of the fine metal particles are stannic oxide ($SnO_2$), zinc oxide (ZnO), indium oxide ($In_2O_3$) and titanium oxide ($TiO_2$). These metal oxides may be used either singly or in combinations of two or more. As the fine metal particles, those having an average particle diameter ranging from 0.01 to 1.0 $\mu$m are preferable.

Moreover, a dopant may be added as required to such fine metal particles as aforementioned. The dopants which are usually used are as follows: Sb (antimony) in the case of $SnO_2$, Al (aluminum) in the case of ZnO and Sn in the case of $In_2O_3$. The above metal oxide may be used in one kind or combination of various kinds. Further the above metal oxide may be coated with $SnO_2$ or Sb-doped $SnO_2$.

Moreover, such fine metal particles as aforementioned may be needle particles. In this case, needle particles whose major axis is in a range from 0.1 to 2 $\mu$m in length and whose aspect ratio is in a range from 10 to 50 are preferred. The use of such fine needle metal particles makes it possible to control the resistivity by using it in an amount smaller than that required for spherical fine metal particles. Hence the transparency of the layer containing the fine metal particles is improved. Also, in the case of using the image-receiving sheet in applications for observing recorded images by using transmitted light such as OHPs, the quality of the transmitted image can be improved.

In the image-receiving sheet of the present invention, $SnO_2$, a metal oxide coated with $SnO_2$ or, especially, stannic oxide doped with antimony is desirably used as the fine metal particles in view of application qualities, stability of the surface resistivity, electroconductivity of a metal and costs.

As to the proportion of the coating solution used to form the layer containing the above fine metal particles, the ratio by weight of the fine metal particles to the thermoplastic resin (binder) is preferably in a range between 0.2 and 2.0. When the ratio by weight of the fine metal particles to the thermoplastic resin is less than 0.2, the surface resistivity of the layer to be formed is not stabilized since the amount of the fine metal particles is small. On the other hand, when the ratio by weight of the fine metal particles to the thermoplastic resin exceeds 2.0, this is undesirable because the color peculiar to the fine metal particles appears prominently, particularly in the case of stannic oxide doped with antimony. (In the case of stannic oxide doped with antimony, a bluish color comes out conspicuously on the surface.)

Preferably the above fine metal particles are processed by hydrophilic treatment performed on the surface thereof and are dispersed in an aqueous solution of the binder resin after a well-known dispersant such as a surfactant or ethylene glycol is added thereto.

Next, examples of the conductive polymer having conjugated double bond of $\pi$ electrons include a polythiophene, polyaniline, sulfonated polyaniline, chemically doped polyacetylene, polyparaphenylene, polyphenylenevinylene, polyparaphenylene sulfide, chemically polymerized and doped polypyrrole, thermally-treated substances of phenol resins, thermally-treated substances of polyamides and thermally-treated substances of perillenic acid anhydride.

As the conductive polymer having a $\pi$ electron conjugated type structure, polyanilines and polythiophenes doped with a sulfonic group are particularly preferable.

The polythiophene used as the charging control agent have a structure consisting of the repetition unit represented by the following general formula (1).

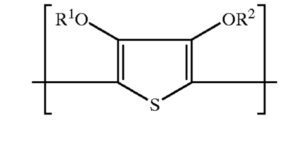

(1)

wherein $R^1$ and $R^2$ respectively independently represent hydrogen or an alkyl group having 1 to 4 carbon atoms or are combined with each other to form an alkylene group having 1 to 4 carbon atoms which may be substituted.

As the alkyl groups having 1 to 4 carbon atoms, a methyl group and an ethyl group can be exemplified.

Examples of the alkylene group having 1 to 4 carbon atoms may include methylene which may be substituted with alkyl groups; 1,2-ethylene or 1,3-propylene which may be respectively substituted with an alkyl group having 1–12 carbon atoms or with an phenyl group; 1,2-cyclohexylene; 2,3-butylene; 2,3-dimethyl-2,3-butylene; 2,3-pentylene and the like. The 1,2-alkylene groups such as 1,2-ethylene may be derived from 1,2-dibromoalkane obtained by brominating a-olefin such as ethene, prop-1-ene, hex-1-ene, oct-1-ene, dec-1-ene and dodec-1-ene or styrene. Among these alkylene groups, methylene, 1,2-ethylene and 1,3-propylene are preferable and 1,2-ethylene is particularly preferable.

The polythiophene consisting of a repetition unit represented by the formula (1) is electron-conductive polymers having conjugated double bond of $\pi$ electrons. Unlike conventional ion-conductive materials, these polythiophenes are changed in the charging controllability with difficulty even with environmental variations and develop almost constant charging controllability even when environmental condition is changed. The use of such a polythiophene as the charging control agent for the image-receiving sheet ensures the production of an image-receiving sheet which always has high toner-fixing ability and excellent image quality and is superior in carriage ability in electrophotographic copying machines or printers without being affected by environmental variations.

Also, since such a polythiophene has high transparency, it may be used to make an image-receiving sheet for OHPs. When transparency is particularly demanded of the image-receiving sheet according to the present invention, the transmittance thereof for rays can be designed to be 70% or more. It is to be noted that carbon black has electronic conductivity or metallic conductivity but no transparency. It is not therefore used for OHPs unlike polythiophenes.

Furthermore, since these polythiophenes are polymers and are bled out with difficulty from the containment layer unlike conventional low molecular weight charging control agent, they do not almost cause stickiness of the image-receiving sheet, reduced charging controllability during storing and contamination (set-off) of the toner receptor layer with the charging control agent bled out.

The above polythiophene is dissolved and dispersed with a part thereof being positively electrified in water or a mixture solvent of water and an organic solvent miscible with water (e.g., methanol, ethanol or acetone) in the presence of poly negative ions. It is therefore possible to form a layer containing a polythiophene with ease by preparing a coating solution, namely a polythiophene-containing coating solution for charging control layer or receptor layer and applying the coating solution onto the substrate of the image-receiving sheet.

As the supply source of the poly negative ion, for example, a polymer sulfonic acid such as polystyrene sulfonic acid, polymer carboxylic acid such as polyacrylic acid, polyphosphoric acid or alkali salts of these compounds, particularly, having a molecular weight of 2,000 to 500,000 may be used. A preferable poly negative ion is polystyrenesulfonic acid. In the case of preparing the dispersant, the average particle diameter of the polythiophene in such a dispersant is preferably designed to be 10 $\mu$m or less. A solution or dispersant containing such a polythiophene is available as commercial products, for example, under the trademark of "Baytron P" from Bayer Ltd.

The coating solution used to form a layer containing a polythiophene is prepared, for instance, by adding the polythiophene and other components in water or an aqueous solvent produced by mixing water with an organic solvent, or by preparing a solution or dispersant containing the polythiophene, and other coating solutions (e.g., a coating solution for receptor layer) separately in advance and thereafter mixing the both. When using a commercially available polythiophene solution or dispersant, as required, it is diluted with water, an organic solvent miscible with water or an aqueous solvent produced by mixing water with an organic solvent, added with other components and mixed with other coating solutions to prepare a coating solution used to form a layer containing the polythiophene.

Then, the coating solution prepared in this manner is applied to or sprayed on the surface of the substrate or another layer formed on the substrate, followed by drying and solidifying to form a polythiophene-containing layer.

When a polythiophene-containing resistance control layer is formed, a coating solution in which the polythiophene is dissolved or dispersed in water or an aqueous solvent produced by mixing water with an organic solvent in the presence of a poly negative ion is applied. The amount of the polythiophene to be added in the charging control layer is generally 1 to 200 parts by weight and preferably 5 to 100 parts by weight based on one part by weight of the binder resin. The amount of the coating solution to be applied is generally about 0.001 to 0.2 g/m$^2$ and preferably about 0.005 to 0.1 g/m$^2$ as a solid.

As other electron-conductive polymers having a $\pi$ electron conjugated type structure, sulfonated polyanilines are useful. The sulfonated polyaniline is polyaniline doped with a sulfone group. Given as one example of the sulfonated polyaniline, although many compounds are known, is a sulfonated polyaniline represented by the following chemical formula 5.

[Chemical Formula 5]

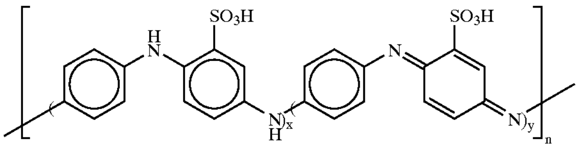

wherein x, y and n are values such that the molecular weight falls in a range between about 300 and 10,000.

The above sulfonated polyaniline is soluble in water or a solvent containing alkaline water and is dissolved while forming a intermolecular salt or an alkali salt. These sulfonated polyanilines are commercially available under the trademark of "aqua Pass-01Z from Nitto Chemical Industry Co., Ltd. in the form of an aqueous solution or a solution of a mixture solvent of water and an organic solvent so that they can be used in the present invention. These solutions are yellowish, but almost non-colored when the concentration is low. Therefore, they can be used without any problem though transparency is demanded of the image-receiving sheet in the applications for observing recorded images by using transmitted light such as OHP sheets.

In the percentage composition of the coating solution used to form the sulfonated polyaniline-containing layer, a binder resin is contained in an amount of about 0.5 to 40% by weight and preferably 1.0 to 30% by weight, sulfonated polyaniline (solid content) in an amount about 0.01 to 10% by weight and preferably 0.05 to 5% by weight, a surfactant in an amount of about 0 to 2% by weight and preferably 0.2 to 1% by weight, which is balanced by a solvent. A most excellent antistatic effect is obtained by selecting the composition of the solvent so that the sulfonated polyaniline is present in the form of particles having a size of 0.01 to 1.0 $\mu$m in the coating solution.

Specifically, the sulfonated polyaniline is soluble in water but insoluble in a water soluble organic solvent. In the preparation of the coating solution, therefore the mixing ratio of water to a water soluble solvent is adjusted and an appropriate surfactant is used together depending on the case whereby the sulfonated polyaniline can be brought into a fine particle-dispersion condition. Namely, the size distribution of the sulfonated polyaniline in the coating solution can be changed by changing the mixing ratio of water as a liquid medium to an organic solvent.

For example, a coating solution consisting of water/IPA=40/60 is undesirable because two separate peaks at about 0.04 $\mu$m and 5 $\mu$m are found in the size distribution of sulfonated polyaniline particles. This is because the sulfonated polyaniline particles having two separate peaks in the size distribution are uniformly dispersed with difficulty in the coating solution and the coating solution fulfills a charging control function only on a special coating condition.

On the contrary, in, for example, a coating solution consisting of water/IPA=47/53-60/40, sulfonated polyaniline particles are distributed in a zone ranging from 0.01 to 1.0 $\mu$m and the coating solution is used as a desirable coating solution. It is to be noted that when a surfactant is used together with the coating solution, the size distribution of the sulfonatedpolyaniline varies depending on the mixing ratio of water to an organic solvent. It is therefore necessary to pay attention to the proportion of the surfactant when it is added.

The formation of the resistance control layer containing a sulfonated polyaniline and a binder is performed by applying the above coating solution to the outermost surface (image-receiving surface, backface) or the underside of the receptor layer or backface of the image-receiving sheet by a customary application method using, for example, a gravure coater, roll coater or wire bar, followed by drying.

The coating amount is in a range between about 0.05 and 10 μm and preferably about 0.5 and 5 μm in terms of coating thickness after being dried. When the coating amount is smaller than the above range, insufficient charging control ability is obtained. On the other hand, even when the coating amount is larger than the above range, the aforementioned ability can not be improved in proportion to a thickness thereof. Hence this not only is economically disadvantageous but also decreases the density of an image produced by electrophotographic copying machines or printers and is hence undesirable.

In a method of controlling the surface resistivity of the image-receiving sheet of the present invention, it is desirable to control the content and coating amount of a resistance control agent contained in the resistance control layer formed on the outermost layer of the image-receiving surface and/or backface or between the receptor layer and the substrate and/or between the backface layer and the substrate of the image-receiving sheet, thereby allowing the surface resistivity of the image-receiving sheet to fall in a range between $10^8$ and $10^{13}$ Ω/sq and making the resistance constant with a variation of less than two digits in the condition ranging between 10° C., 30% humidity and 30° C., 80% humidity.

Here, the term "a variation of less than two digits" means that when the minimum and maximum values of variable surface resistivity are a (Ω/sq) and (Ω/sq) respectively, the relation b/a≦100 is established.

Each surface resistivity, namely each sheet resistivity of the image-receiving surface and backface of the image-receiving sheet can be controlled by changing the conductivity of a layer having charging controllability. For instance, when the thickness of the resistance control layer is increased, the conductivity is increased and hence the sheet resistance is decreased. The conductivity of the layer having charging controllability can be changed by changing various conditions such as each thickness of the resistance control layer, the substrate and the like, the compounding ratio of the resistance control agent to the binder resin in the layer, and the mixing ratio of water, an organic solvent and a surfactant in the coating solution.

When the surface resistivity of the image-receiving sheet is lower than $10^8$ Ω/sq, the transfer efficiency is reduced and hence the recording density tends to be reduced. On the contrary, a surface resistivity exceeding $1\times10^{13}$ Ω/sq causes an electric discharge when the image-receiving sheet is peeled from a light sensitive body after toner-transfer. This causes, for instance, the toner to scatter, leading to disorders of characters and images, whereby the quality and distinctness of the image are decreased. Also, carriage inferiors and adsorption of dusts in the electrophotographic copying machines or printers tend to be caused by the production of static electricity and insufficient lubricity.

EXAMPLES

The present invention will be explained in more detail by way of examples, in which all designations of parts and % indicate parts by weight and weight percentage (wt. %), respectively, unless otherwise noted.

Example 1

A receptor layer for recording an image was formed on one surface of a substrate shown below by using a receptor layer-coating solution 1 having the following composition. On the receptor layer, a resistance control layer was formed using a resistance control layer-coating solution 1 shown below to manufacture an image-receiving sheet of Example 1.

Also, the thickness (in the dried state) of the receptor layer was 3 μm and the thickness of the resistance control layer was controlled such that the surface resistivity of the image-receiving sheet was 1 to $5\times10^{11}$ Ω/sq.

| | |
|---|---|
| Substrate | |
| 100-μm-thick polyethylene terephthalate film | |
| Receptor layer-coating solution 1 | |
| Polyester resin solution (polymer of terephthalic acid and propylene glycol modified bisphenol A, glass transition temperature: 60° C., solid content: 30%, softening point: 100° C.) | 15 parts |
| Silica filler (average particle diameter: 5 μm) | 1 part |
| Methyl ethyl ketone | 40 parts |
| Toluene | 45 parts |

| Resistance control layer-coating solution 1 | |
|---|---|
| Cationic modified quaternary ammonium salt | 0.1 parts |
| Isopropyl alcohol | 100 parts |

Example 2

A receptor layer for recording an image was formed on one surface of the same substrate that was used in Example 1 by using a receptor layer-coating solution 2 having the following composition. On the receptor layer, a resistance control layer was formed using the resistance control layer-coating solution 1 used in Example 1 to manufacture an image-receiving sheet of Example 2.

The thickness (in the dried state) of the receptor layer was 1 μm and the thickness of the resistance control layer was controlled such that the surface resistivity of the image-receiving sheet was 1 to $5\times10^{11}$ Ω/sq.

| Receptor layer-coating solution 2 | |
|---|---|
| Urethane modified polyester resin solution (glass transition temperature: 80° C., solid content: 30%) | 40 parts |
| Silica filler (average particle diameter: 5 μm) | 1 part |
| Methyl ethyl ketone | 50 parts |
| Toluene | 10 parts |

Example 3

A receptor layer for recording an image was formed on one surface of the same substrate that was used in Example 1 by using the receptor layer-coating solution 2 used in Example 2. On the receptor layer, a resistance control layer was formed using the resistance control layer-coating solution 1 used in Example 1. In addition, a backface layer was formed on the other surface of the substrate by using a backface-coating solution 1 shown below. On the backface layer, a resistance control layer was formed using the resistance control layer-coating solution 1 used in Example 1 to manufacture an image-receiving sheet of Example 3. The thicknesses (in the dried state) of the receptor layer and backface layer were both 1 μm. Each thickness of the resistance control layers formed on the surface and backface of the image-receiving sheet was controlled such that the surface resistivity of the image-receiving sheet was 1 to $5\times10^{11}$ Ω/sq.

| Backface layer-coating solution 1 | |
|---|---|
| Urethane modified polyester resin solution (glass transition temperature: 80° C., solid content: 30%) | 40 parts |
| Silica filler (average particle diameter: 5 μm) | 0.1 parts |
| Methyl ethyl ketone | 50 parts |
| Toluene | 10 parts |

Example 4

A resistance control layer was formed on one surface of the same substrate that was used in Example 1 by using the resistance control layer-coating solution 2 shown below. On the resistance control layer, a receptor layer for recording an image was formed by using the receptor layer-coating solution 2 used in Example 2. In addition, a resistance control layer was formed on the other surface of the substrate by using a resistance control layer-coating solution 2 shown below. On the resistance control layer, a backface layer was formed using the backface layer-coating solution 1 used in Example 3 to manufacture an image-receiving sheet of Example 4.

The thicknesses (in the dried state) of the receptor layer and backface layer were both 1 μm. Each thickness of the resistance control layers formed on the surface and backface of the image-receiving sheet was controlled such that the surface resistivity of the image-receiving sheet was 1 to $5\times10^{11}$ Ω/sq.

| Resistance control layer-coating solution 2 | |
|---|---|
| Water dispersion of needle stannic oxide (major axis: 1 μm, aspect ratio: 20, solid content: 20%) | 30 parts |
| Water dispersion of a polyester resin (glass transition temperature: 60° C., solid content: 20%) | 30 parts |
| Isopropyl alcohol | 20 parts |
| Water | 20 parts |

Example 5

A resistance control layer was formed on one surface of the same substrate used in Example 1 by using a resistance control layer-coating solution 3 having the following composition. On the resistance control layer, a receptor layer for recording an image was formed using the receptor layer-coating solution 2 used in Example 2 to manufacture an image-receiving sheet of Example 5.

The thickness (in the dried state) of the receptor layer was 1 μm and the thickness of the resistance control layer was controlled such that the surface resistivity of the image-receiving sheet was 1 to $5\times10^{11}$ Ω/sq.

| Resistance control layer-coating solution 3 | |
|---|---|
| Polyester resin solution (copolymer of terephthalic acid and diethylene glycol, glass transition temperature: 40° C., solid content: 30%) | 10 parts |
| Aqueous polythiophene aqueous solution (Baytron P produced by Bayer Ltd., solid content: 1%) | 50 parts |
| Isopropyl alcohol | 20 parts |
| Water | 20 parts |

Example 6

A resistance control layer was formed on one surface of the same substrate used in Example 1 by using a resistance control layer-coating solution 4 shown below. On the resistance control layer, a receptor layer for recording an image was formed using the receptor layer-coating solution 2 used in Example 2 to manufacture an image-receiving sheet of Example 6.

The thickness (in the dried state) of the receptor layer was 1 μm and the thickness of the resistance control layer was controlled such that the surface resistivity of the image-receiving sheet was 1 to $5\times10^{11}$ Ω/sq.

| Resistance control layer-coating solution 4 | |
|---|---|
| Sulfonated polyaniline (SAVE-01Z, manufactured by Nitto Chemical Industry Co., Ltd., solid content: 10%) | 1 part |
| Aqueous polyester resin solution (Polyester WR-961, manufactured by The Nippon Synthetic Chemical Industry, Co., Ltd., solid content: 30%) | 5 parts |
| Isopropyl alcohol | 47 parts |
| Water | 47 parts |

Comparative Example 1

A receptor layer for recording an image was formed on one surface of the same substrate that was used in Example 1 by using a receptor layer-coating solution 3 shown below. On the receptor layer, a resistance control layer was formed using a resistance control layer-coating solution 5 shown below to manufacture an image-receiving sheet of Comparative Example 1.

The thickness (in the dried state) of the receptor layer was 3 μm and the thickness of the resistance control layer was controlled such that the surface resistivity of the image-receiving sheet was 1 to $5\times10^{11}$ Ω/sq.

| Receptor layer-coating solution 3 | |
|---|---|
| Polyester resin (copolymer of fumaric acid and propylene glycol modified bisphenol A, glass transition temperature: 60° C., softening point: 100° C.) | 30 parts |
| Fine silica particles (average particle diameter: 5 μm) | 0.15 parts |
| Methyl ethyl ketone | 35 parts |
| Toluene | 35 parts |

| Resistance control layer-coating solution 5 | |
|---|---|
| Quaternary ammonium type surfactant | 0.1 parts |
| Isopropyl alcohol | 100 parts |

The image-receiving sheets of the aforementioned examples and comparative example were subjected to the following tests to evaluate the carriage quality in printers, the haze thereof and each Beck smoothness of the receptor layer and backface layer according to the methods described below.

The surface resistivity of each image-receiving sheet of the examples and comparative example was measured using a surface resistance measuring device (Hiesta, manufactured by Mitsubishi Petrochemical Co., Ltd.) wherein a voltage of 500 V was applied to the surface of each image-receiving sheet in the condition of a temperature of 23° C. and a humidity of 50% to measure the surface resistivity 10 seconds after the voltage application was started.

(Evaluation Method)

Carriage Quality

Each 50 image-receiving sheets of the examples and comparative examples were prepared to examine the pickup quality, namely the number of jams in 50 sheets during paper-feeding from a cassette by using a commercially available electrophotographic system printer.

Haze, Beck Smoothness

The haze (misting value) is defined as a value (%) measured by the method prescribed in JIS K 7105 in the entire structure of each image-receiving sheet of the examples and comparative example. The Beck smoothness is defined as a value measured by the method prescribed in JIS P 8119 and was measured for the surface (surface on which an image is recorded) and backface of each receiving sheet of the examples and comparative examples.

(Results of Evaluation)

The results of evaluation of each example and comparative example are shown in Table 1.

TABLE 1

| | Carriage quality | Haze | Beck smoothness (seconds) | |
|---|---|---|---|---|
| | (Number of jams) | (%) | Surface | Backface |
| Example 1 | 0/50 | 13 | 500 | 50000 |
| Example 2 | 0/50 | 9 | 1200 | 50000 |
| Example 3 | 0/50 | 11 | 1200 | 10000 |
| Example 4 | 0/50 | 12 | 1100 | 10000 |
| Example 5 | 0/50 | 9 | 1200 | 50000 |

TABLE 1-continued

| | Carriage quality | Haze | Beck smoothness (seconds) | |
|---|---|---|---|---|
| | (Number of jams) | (%) | Surface | Backface |
| Example 6 | 0/50 | 9 | 1300 | 50000 |
| Comp. Example 1 | 3/50 | 3 | 3000 | 50000 |

What is claimed is:

1. An image-receiving sheet comprising a substrate and at least one containment layer containing a binder and a filler having a Beck smoothness of 2,000 seconds or less, and wherein the haze of the image-receiving sheet is 5 to 15%, and further at least one resistance control layer to control toner-fixing ability, said resistance control layer each being formed between the containment layer and the substrate or on the outermost layer of the containment layer; wherein if a containment layer is formed on both sides of the substrate, one of the containment layers has a Beck smoothness of 20,000 seconds or less, and one of the containment layers is a receptor layer and the other is a backface layer.

2. An image-receiving sheet according to claim 1, wherein said resistance control layer contains an ion-conductive resistance control material.

3. An image-receiving sheet according to claim 1, wherein said resistance control layer contains a resistance control material made of fine metal particles having an average particle diameter from 0.01 to 1.0 $\mu$m.

4. An image-receiving sheet according to claim 1, wherein said resistance control layer contains a resistance control material made of conductive polymers having a conjugated double bond of $\pi$ electrons.

5. An image receiving sheet according to claim 1, wherein said image-receiving sheet has a parallel ray transmittance of 70% or more.

6. An image-receiving sheet comprising a substrate and at least one containment layer containing a binder and a filler having a Beck smoothness of 2,000 seconds or less, and wherein the haze of the image-receiving sheet is 5 to 15%, and further at least one resistance control layer to control toner-fixing ability, said resistance control layer each being formed between the containment layer and the substrate or on the outermost layer of the containment layer, wherein said resistance control layer contains a resistance control material made of conductive polymers having a conjugated double bond of $\pi$ electrons.

7. An image receiving sheet according to claim 6, wherein said image-receiving sheet has a parallel ray transmittance of 70% or more.

* * * * *